United States Patent [19]

Grant

[11] Patent Number: 4,702,602
[45] Date of Patent: Oct. 27, 1987

[54] DITHER MECHANISM FOR RING LASER GYROSCOPE

[75] Inventor: George S. Grant, Grangemouth, Scotland

[73] Assignee: Ferranti, plc, Cheadle, England

[21] Appl. No.: 890,366

[22] Filed: Jul. 29, 1986

[30] Foreign Application Priority Data

Aug. 6, 1985 [GB] United Kingdom ............... 8519743

[51] Int. Cl.$^4$ ............................................. G01C 19/64
[52] U.S. Cl. ...................................... 356/350; 310/19
[58] Field of Search ..................... 356/350; 310/19, 27

[56] References Cited

U.S. PATENT DOCUMENTS 4,349,183  9/1982  Wirt et al. ........................... 356/350

*Primary Examiner*—Vincent P. McGraw
*Assistant Examiner*—S. A. Turner
*Attorney, Agent, or Firm*—Kerkam, Stowell, Kondracki & Clarke

[57] ABSTRACT

A dither mechanism comprises a hub (10) arranged to be fixed to a mounting, and a rim (11) coaxial with the hub and to which the ring laser may be attached. A number of radial spokes (12) interconnect the hub (10) and the rim (11), and each has its point of attachment to the rim (11) recessed into the rim in a radial direction. A pair of pegs (32) is associated with at least one spoke and is arranged for insertion into the recesses (15) between the rim and each side of the spoke (12) so as to vary the effective length of the spoke. Drive means (30) are provided for imparting an oscillatory rotational motion to the rim (11) relative to the hub (10) about the axis of the hub.

5 Claims, 3 Drawing Figures

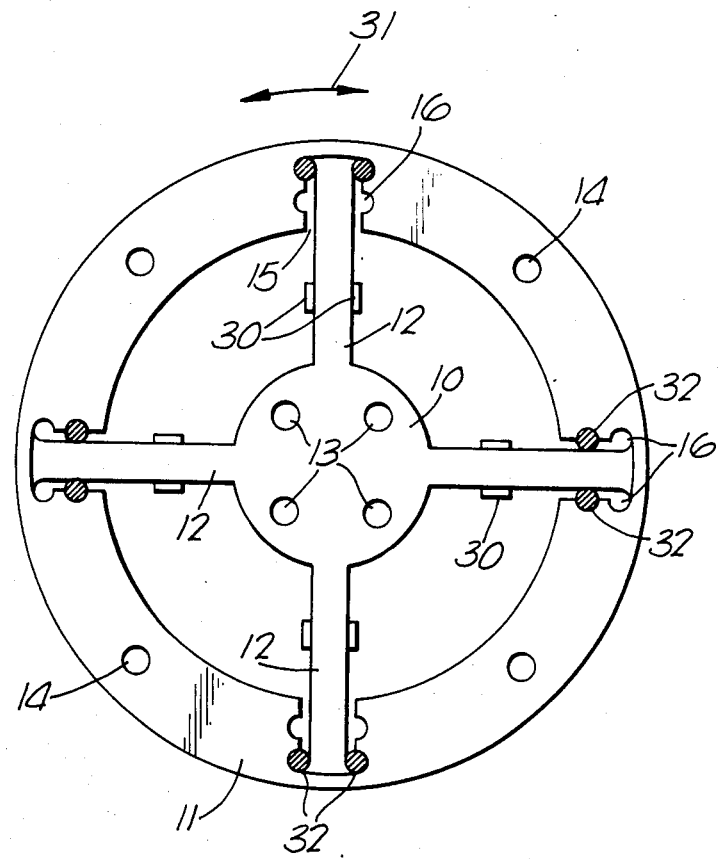

DITHER MECHANISM FOR RING LASER GYROSCOPE

This invention relates to dither mechanisms for ring laser gyroscopes and in particular to tuning arrangements for such mechanisms.

A ring laser gyroscope is a device in which two beams of laser light circulate in opposite directions around a closed path in a laser optical cavity of the appropriate form. Rotations of the cavity result in phase shifts of each beam which produce frequency changes, and the frequency difference between the two beams is proportional to the rate of angular rotation of the ring laser. Ring lasers are subject to a problem known as "mode locking", which occurs at low angular velocities due to the two beams appearing to have the same frequency. One technique commonly used to avoid this problem is to introduce a deliberate mechanical vibration or "dither". Many techniques are known for producing dither, though the majority of these involve mounting the ring laser on a platform having a suspension which allows it to be oscillated about a single axis by a suitable drive such as a piezo-electric motor.

The frequency of the dither has to be carefully tuned to prevent the dither vibrations from affecting other equipment or other laser gyros similarly mounted about orthogonal axes. It is common practice for the suspension to be manufactured to very close tolerances to ensure proper tuning of the ring laser gyro. This clearly calls for high accuracy and hence affects the cost of the suspension.

It is an object of the invention to provide a ring laser gyroscope in which tuning of the dither frequency may readily be adjusted after the manufacture of the gyroscope.

According to the present invention there is provided a dither mechanism for a ring laser gyroscope, which includes a hub arranged to be fixed relative to a mounting for the gyroscope, a rim coaxial with the hub and to which the gyroscope may be attached, a number of radial spokes interconnecting the hub and the rim and each having its point of attachment to the rim recessed into the rim in a radial direction, and a pair of pegs associated with at least one spoke and arranged for insertion into the recesses between the rim and the spoke on each side of the spoke so as to vary the effective length of the spoke.

The invention will now be described with reference to the accompanying drawings, in which:

FIG. 3 is a plan view of the complete dither mechanism.

Figure 1:
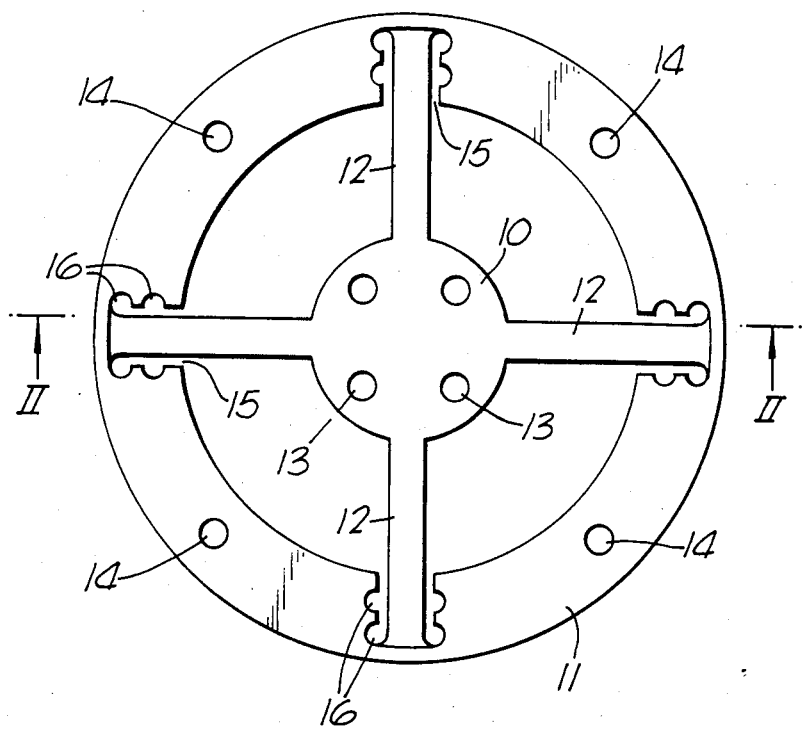
FIG. 1 is a plan view of a dither wheel.
Figure 2:
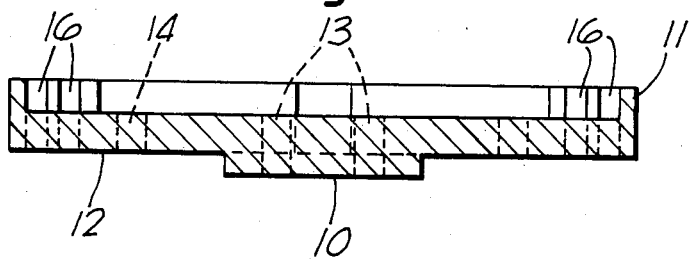
FIG. 2 is a sectional side view of the wheel of FIG. 1 along the line II—II.

Referring now to FIGS. 1 and 2, a dither wheel comprises a central hub 10, an annular rim 11 coaxial with the hub 10, and a number of radial spokes 12 (in this case, four) interconnecting the hub 10 and the rim 11. The hub is provided with a number of holes 13 to allow it to be secured, say by screws or bolts, to a mounting (not shown). The rim 11 is likewise provided with a number of holes 14 to allow the ring laser (not shown) to be mounted on the rim.

The point of attachment of each of the spokes 12 to the rim 11 is recessed into the rim in a radial direction as shown, and each recess 15 is formed with two part-circular grooves 16.

The complete dither mechanism, but without the mounting or ring laser, is shown in plan view of FIG. 3. Features not shown in FIGS. 1 and 2 include the drive means, comprising piezo-electric crystal wafers 30 attached to each side of each of the spokes 12. The application of suitable alternating voltages to the piezo-electric crystals in a known manner enables an oscillatory rotation to be produced about the axis of the hub as indicated by the arrow 31.

The other feature not shown in FIGS. 1 and 2 are pairs of pegs 32 which may be inserted into one or more of the pairs of grooves 16 between a spoke and the rim. The pegs are made to be an interference fit in the grooves. A peg inserted in a corresponding groove on each side of a spoke and has the effect of shortening the length of the spoke and thus altering its period of oscillation. Any desired combination of pairs of pegs may be used. For purposes of mass balance it may be preferable to insert pairs of pegs in corresponding positions on opposite spokes, but this is not essential. It will be seen in FIG. 3 that pegs 32 are inserted into grooves at the ends of all four spokes, though not all in the same positions.

As already stated, the number of spokes may be changed from the four shown, depending to some extent upon the mass of the ring laser to be supported by the spokes.

The mechanism for producing the dither oscillator need not use piezo-electric crystals and other techniques are known and equally suitable.

The tuning arrangement shown has the advantage of being adjustable over a considerable range. As the pegs 32 are on interference fit in the grooves 16 there is no need to provide any means for securing them in position.

What I claim is:

1. A dither mechanism for a ring laser gyroscope, which includes a hub arranged to be fixed to a mounting for the gyroscope, a rim coaxial with the hub and to which the gyroscope may be attached, a number of radial spokes interconnecting the hub and the rim and each having its point of attachment to the rim recessed into the rim in a radial direction, and a pair of pegs associated with at least one spoke and arranged for insertion into the recesses between the rim and the spoke on each side of the spoke so as to vary the effective length of the spoke.

2. A mechanism as claimed in claim 1 in which each recess contains a number of grooves into which a peg may be inserted.

3. A mechansim as claimed in claim 2 in which a peg is an interference fit in a corresponding groove.

4. A mechanism as claimed in claim 1 which includes drive means for imparting an oscillatory rotational motion to the rim relative to the hub about the axis of the hub.

5. A mechanism as claimed in claim 4 in whch the drive means includes a number of piezo-electric crystals attached to each spoke and arranged to be excited by an alternating voltage to produce the required motion.

* * * * *